US008564249B2

(12) United States Patent
Lundqvist et al.

(10) Patent No.: US 8,564,249 B2
(45) Date of Patent: Oct. 22, 2013

(54) CHARGING UNIT WITH TWO POWER SOURCE INPUTS

(75) Inventors: Timo Tapani Lundqvist, Teijo (FI); Jari Tuomo Pistemaa, Pertteli (FI)

(73) Assignee: Nokia Corporation, Espoo (FI)

(*) Notice: Subject to any disclaimer, the term of this patent is extended or adjusted under 35 U.S.C. 154(b) by 791 days.

(21) Appl. No.: 12/520,567

(22) PCT Filed: Dec. 21, 2006

(86) PCT No.: PCT/IB2006/055004
§ 371 (c)(1),
(2), (4) Date: Jun. 22, 2009

(87) PCT Pub. No.: WO2008/075140
PCT Pub. Date: Jun. 26, 2008

(65) Prior Publication Data
US 2010/0060239 A1  Mar. 11, 2010

(51) Int. Cl.
*H02J 7/00* (2006.01)
*H02J 7/04* (2006.01)
*H02J 1/10* (2006.01)
*H02J 7/34* (2006.01)
*H02J 1/00* (2006.01)
*H02J 3/00* (2006.01)
*H03K 19/00* (2006.01)

(52) U.S. Cl.
USPC ............... 320/138; 320/139; 307/44; 307/45; 307/56; 307/72; 307/75; 307/80; 307/82; 307/87

(58) Field of Classification Search
USPC ............ 320/138, 139; 307/44, 45, 56, 72, 75, 307/80, 82, 87
See application file for complete search history.

(56) References Cited

U.S. PATENT DOCUMENTS

| 5,477,126 | A | * | 12/1995 | Shiojima ........................ 320/138 |
| 5,477,127 | A | * | 12/1995 | Shiojima et al. ............... 320/138 |
| 5,903,634 | A | | 5/1999 | Wakabayashi et al. |
| 5,946,636 | A | | 8/1999 | Uyeno et al. |
| 5,969,438 | A | * | 10/1999 | Odaohara ........................ 307/80 |
| 6,288,522 | B1 | | 9/2001 | Odaohara et al. |
| 6,385,466 | B1 | | 5/2002 | Hirai et al. |
| 6,438,390 | B1 | | 8/2002 | Awan |
| 6,690,955 | B1 | | 2/2004 | Komiyama |
| 6,774,508 | B2 | | 8/2004 | Ballantyne et al. |

(Continued)

FOREIGN PATENT DOCUMENTS

CA    2550404 A1    12/2006

OTHER PUBLICATIONS

"International Search Report and the Written Opinion of the International Searching Authority", received in corresponding PCT Application No. pct/ib2006/055004, Dated Sep. 27, 2007, 10 pages.

(Continued)

*Primary Examiner* — Yalkew Fantu
*Assistant Examiner* — Steve T Chung
(74) *Attorney, Agent, or Firm* — Harrington & Smith

(57) ABSTRACT

A charging unit comprises a first input connectable to a first power source, a second input connectable to a second power source, and an output for connection to a battery to be charged. The charging unit also comprises a power supply unit operable simultaneously to provide power from the first input and power from the second input to the output.

16 Claims, 7 Drawing Sheets

(56) References Cited

U.S. PATENT DOCUMENTS

| | | | |
|---|---|---|---|
| 6,956,357 B2 * | 10/2005 | Nagai et al. | 320/148 |
| 7,097,318 B2 | 8/2006 | Yoshihara | |
| 7,253,589 B1 * | 8/2007 | Potanin et al. | 320/138 |
| 7,657,290 B2 * | 2/2010 | Veselic et al. | 455/572 |
| 2002/0019248 A1 | 2/2002 | Ruck | |
| 2002/0042288 A1 | 4/2002 | Nakayama | |
| 2004/0067769 A1 | 4/2004 | King et al. | |
| 2004/0123281 A1 | 6/2004 | Olrik et al. | |
| 2004/0137954 A1 | 7/2004 | Engstrom et al. | |
| 2004/0203490 A1 | 10/2004 | Kaplan | |
| 2005/0141208 A1 | 6/2005 | Niinuma | 361/797 |
| 2005/0272474 A1 | 12/2005 | Blersch | |
| 2006/0084394 A1 | 4/2006 | Engstrom et al. | |
| 2006/0195835 A1 | 8/2006 | Olrik et al. | |

OTHER PUBLICATIONS

File History for U.S. Appl. No. 10/932,544, Published as of Mar. 11, 2011.

File History for U.S. Appl. No. 11/560,627, Published as of Jan. 23, 2008.

* cited by examiner

CHARGING UNIT WITH TWO POWER SOURCE INPUTS

BACKGROUND OF THE INVENTION

1. Technical Field

The present invention relates to a charging unit. In particular, although not exclusively, the present invention relates to a charging unit comprising a switched mode power supply.

2. Description of Related Art

Portable devices are often powered by a rechargeable battery. Most commonly, the rechargeable battery is charged by a charger including an AC to DC converter and being connected to an AC mains power supply. In addition, DC chargers such as vehicle chargers can be used to recharge batteries. Such chargers typically can provide charging currents of around 1 A.

Some portable devices have a USB port for connection to a host device. The USB connection can be used for data transfer. For example, a mobile phone may be connected to a computer for synchronising their respective address books.

The USB specification also provides that a USB connection is able to supply power to a device. However, the power that can be supplied is limited. The USB specification recites a DC voltage of 4.75 to 5.25V, and the current that can be provided through a USB connection is limited to around 0.5 A. Thus, the time taken to charge a portable device using only USB charging can be significantly longer than is found when using AC mains charging.

Portable devices that allow both USB charging and AC mains charging have been proposed. One example is described in US 2005/0141208. This document describes a USB device that can be connected simultaneously to an AC adapter and to a USB port on a host device by a USB connection. When the AC adapter is connected, the USB device operates as a self-powered USB device, i.e. it is not supplied with power from the host device.

BRIEF SUMMARY OF THE INVENTION

The present invention seeks to provide a charging unit for a portable device that can decrease the charging time of a battery of the portable device.

According to a first aspect of the present invention there is provided a charging unit comprising: a first input connectable to a first power source; a second input connectable to a second power source; an output, for connection to a battery to be charged; and a power supply unit operable simultaneously to provide power from the first input and power from the second input to the output.

This can allow a higher charging current to be provided without requiring higher capacity power sources.

According to a second aspect of the present invention there is provided a charging unit comprising: a first input connectable to a first power source; a second input connectable to a second power source; an output, for connection to a battery to be charged; and a power supply unit comprising: a first switching unit; a second switching unit; a converter having an input and an output; and a controller; the first switching unit being connected between the first input and the input of the converter, and the second switching unit being connected between the second input and the input of the converter, the output of the converter being connected to the charging unit output, wherein the controller is operable simultaneously to provide first and second oscillating control signals to the first and second switching units respectively.

This can allow charging from two power sources at the same time. This may be termed a "power harvesting" mode. Charging from two power sources can be achieved using a single power supply. Thus, a higher charging current to be provided without requiring higher capacity power sources.

According to a third aspect of the present invention there is provided a charging unit a charging unit comprising: a first input connectable to a first power source; a second input connectable to a second power source; an output, for connection to a battery to be charged; and a power supply unit comprising: a first switching unit; a second switching unit; a first converter having an input and an output; a second converter having an input and an output; and a controller; the first switching unit being connected between the first input and the input of the first converter, and the second switching unit being connected between the second input and the input of the second converter, the output of the first converter and the output of the second converter being commonly connected to the charging unit output, wherein the controller is operable simultaneously to provide first and second oscillating control signals to the first and second switching units respectively.

According to a fourth aspect of the present invention there is provided a method of operating a charging unit, the charging unit comprising: a first input connectable to a first power source; a second input connectable to a second power source; an output, for connection to a battery to be charged; and a power supply unit, the method comprising: controlling the power supply unit simultaneously to provide at the output power from the first input and power from the second input.

According to a fifth aspect of the present invention there is provided computer-readable instructions, preferably stored on a computer readable medium, comprising instructions for calculating a frequency, a mark size and a phase of each of first and second oscillating control signals for feeding to first and second switching units respectively of a charging unit of the present invention.

BRIEF DESCRIPTION OF THE SEVERAL VIEWS OF THE DRAWINGS

Embodiments of the present invention will now be described, by way of example only, with reference to the accompanying drawings in which.

In the Figures, reference numerals are re-used for like elements throughout.

DETAILED DESCRIPTION OF THE INVENTION

Figure 1:
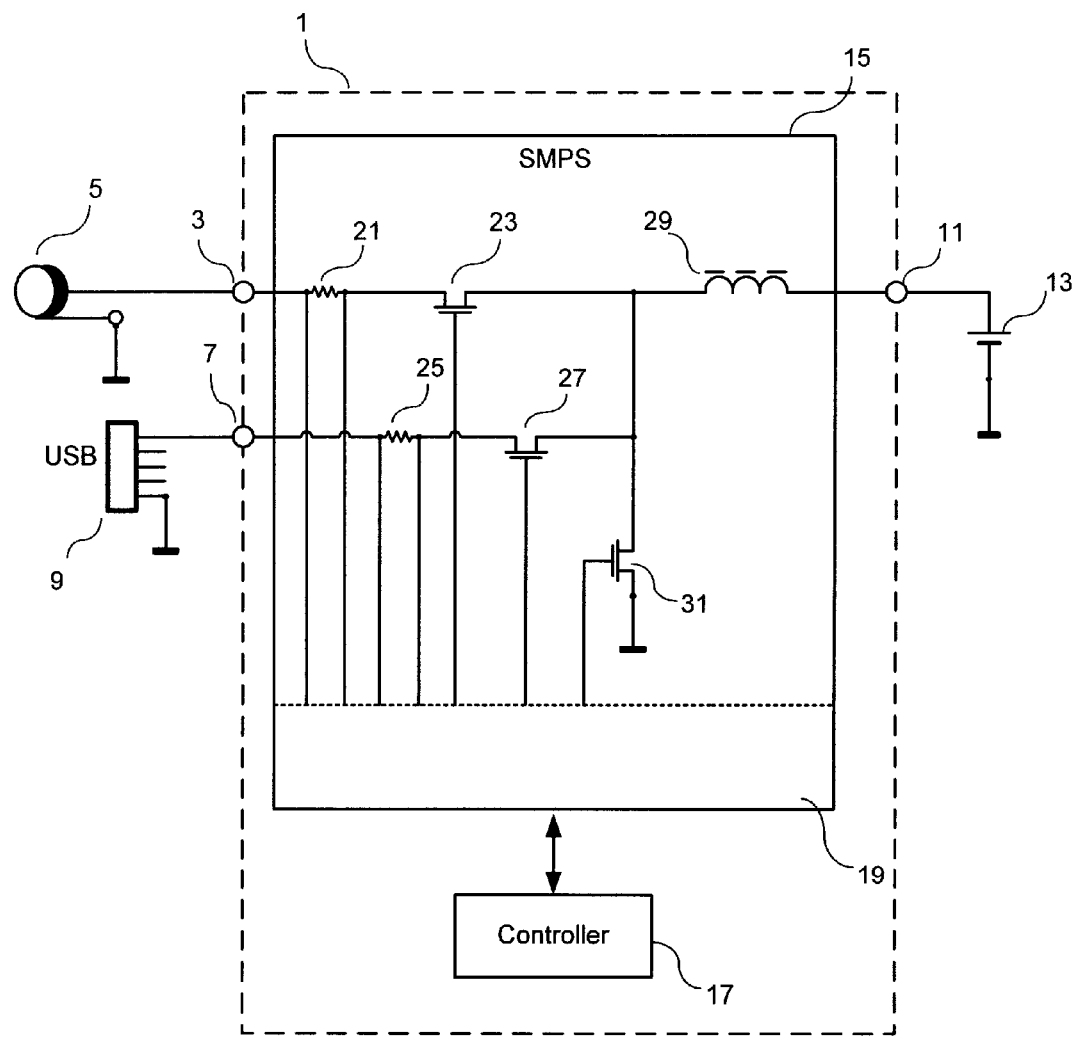
FIG. 1 is a schematic of a first embodied charging unit according to the present invention.

Referring firstly to FIG. 1, a charging unit 1 comprises a first input 3 connected to an AC mains power supply 5 and a second input 7 connected to a USB power supply 9. It will be appreciated that other types of power supply can be connected to the first input 3. The charging unit 1 has an output 11 connected to a rechargeable battery 13.

The charging unit 1 further comprises a switched mode power supply (SMPS) 15. The SMPS 15 is a buck converter type of power supply. The charger unit 1 also includes a controller 17, operable to provide control signals to a control part 19 of the SMPS 15.

The first input 3 is connected via a first current measurement resistor 21 to a first switch 23. The first switch 23 is a MOSFET, having a gate connected to the control part 19 of the SMPS 15. The second input 7 is connected via a second current measurement resistor 25 to a second switch 27. The second switch 27 is also a MOSFET, having a gate connected to the control part 19 of the SMPS 15.

Outputs of the first switch 23 and the second switch 27 are commonly connected to an input of a coil 29. The input of the coil 29 is also connected via a third switch 31 to ground. The third switch 31 is a MOSFET, having a gate connected to the control part 19 of the SMPS 17. An output of the coil 29 is connected to the output 11 of the charging unit 1.

to The AC mains power supply 5 includes an AC to DC converter. As an example, the AC to DC converter is operable to provide a maximum current of 1 A at a voltage of 5V to the first input 3.

The USB power source 9 is operable to supply DC power to the second input 7. As an example, the USB power source 9 is a USB hub of a host device, and is operable to provide a maximum current of 0.5 A and a voltage of 5V to the second input 7. In another example (not shown), the USB power source 9 is a USB charger, and is operable to provide a maximum current of 1.8 A and a voltage of 5V to the second input 7.

The first, second and third switches 23, 27, 31 are preferably unidirectional MOSFETs. Thus, if the first switch and the second switch are closed at the same time current is not able to flow to the USB power source 9, which is forbidden by the USB standard. In another example (not shown), each of the unidirectional MOSFETs can be replaced with a diode in series with a bidirectional MOSFET.

The controller 17 is operable to provide the control part 19 with predetermined values for an output voltage of the SMPS 15 and a priority for current drain. The control part 19 is operable to independently control the first switch 23 and the second switch 27. The control part 19 includes a system clock (not shown) and a control loop (not shown). The control part 19 is operable to use the predetermined value to calculate waveforms for each of first, second and third oscillating control signals, and to generate said first, second and third oscillating control signals using the system clock.

The control part 19 is operable to provide the first oscillating control signal to the first switch 23. The first control signal can either be in a high state, representing "1", or a low state, representing "0". The high state can be termed a "mark" or on state. The low state can be termed a "space" or off state. If the first control signal applied to the gate of the first switch 23 is "1", the first switch 23 is closed and current is able to flow from the AC mains power supply 3 to the coil 29.

The control part 19 is operable to provide the second oscillating control signal to the second switch 27. The second control signal can either be in a high state, representing "1", or a low state, representing "0". If the second control signal applied to the gate of the second switch 27 is "1", the second switch 27 is closed and current is able to flow from the USB power source 9 to the coil 29.

This control arrangement can result in an oscillating voltage being provided at the coil 29. The oscillations have a duty cycle, which is defined as the ratio of the time in each cycle that a non-zero voltage is provided at the coil 29 to the total cycle length. In a buck converter, the duty cycle of the oscillations is directly proportional to the voltage scaling of the SMPS 15.

The control part 19 is operable to provide the third oscillating control signal to the third switch 31. The third oscillating control signal is arranged to be "0" if either of the first control signal and the second control signal is "1", and is arranged to be "1" otherwise, in particular when both the first control signal and second control signal are "0". Thus, the third switch 31 is controlled to be open if either of the first switch 23 and second switch 27 is closed, and is controlled to be closed if both the first switch 23 and second switch 27 are open. When the third switch 31 is closed, current can flow from ground through the third switch 31 and the coil 29 to the battery 13.

When the first switch 23 or the second switch 27 is closed, current through the coil 29 increases. The coil 29 acts to oppose the change in current, and stores energy during this part of the cycle. When the first switch 23 and second switch 27 are both open, the coil 29 can release this energy, and current flows through the third switch 31 and is provided through the output 11 to the battery 13. In this way, an oscillating direct current at a required voltage can be provided to the output 11.

The control part 19 is operable to measure the voltage and current across both the first current measurement resistor 21 and second current measurement resistor 25. These voltage and current measurements are communicated to the controller 17. The controller 17 is operable to adjust the control signals provided to the first switch 23, second switch 27, and third switch 31 based on these measurements, so as to provide a constant voltage to the output 11. In this example, the preferred voltage of the battery 13 is 3 volts. To achieve this preferred voltage, the duty cycle of oscillations at the coil 29 is controlled to be 60%.

Figure 2A:
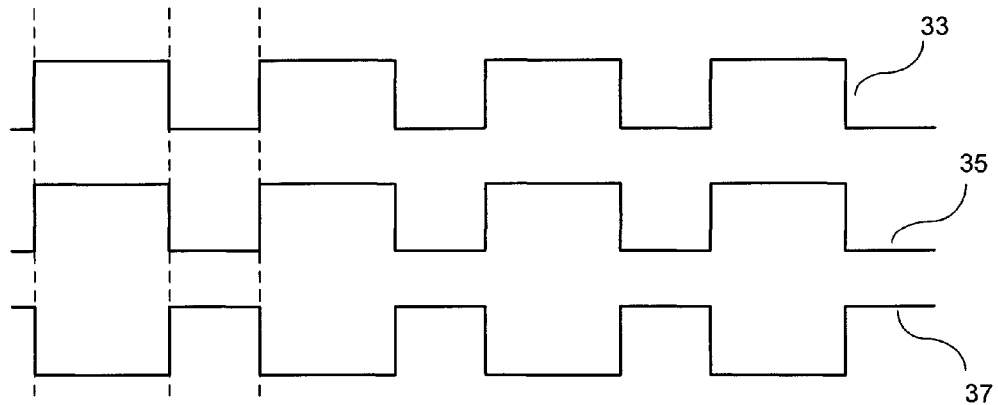
FIGS. 2A, 2B and 2C illustrate control signals applied to the FIG. 1 charging unit.

Referring to FIG. 2A, the first control signal 33 and the second control signal 35 can have the same waveform and can be in phase with one another. A third control signal 37 applied to the third switch 31 is the complement of the first and second control signals 33, 35. That is, when the first and second control signal 33, 35 are "1", the third control signal 37 is "0", and when the first and second control signals 33, 35 are "0", the third control signal 37 is "1".

In this example, the duty cycle is 60%. Therefore the voltage output by the SMPS 15 is 5V×0.6=3V. Taking the efficiency of the SMPS to be 90%, this results in the current from the AC mains power supply 5 being 1.5 A, if the input current is 1 A, and the current from the USB power source 9 being 0.75 A, if the input current is 0.5 A. Therefore, the total current being provided to the battery is 2.25 A. Moreover, this is achieved through the provision of 1 A by the mains power source 5 and 0.5 A by the USB power source 9. The charging current is greater than the charging current that could be achieved using a single power source. It can be said that the powers of the power sources are summed.

An advantage of applying the control signals in this way is that only a single control signal can be provided to both the first switch 23 and the second switch 27. Thus, the control circuitry can be simplified.

Figure 2B:
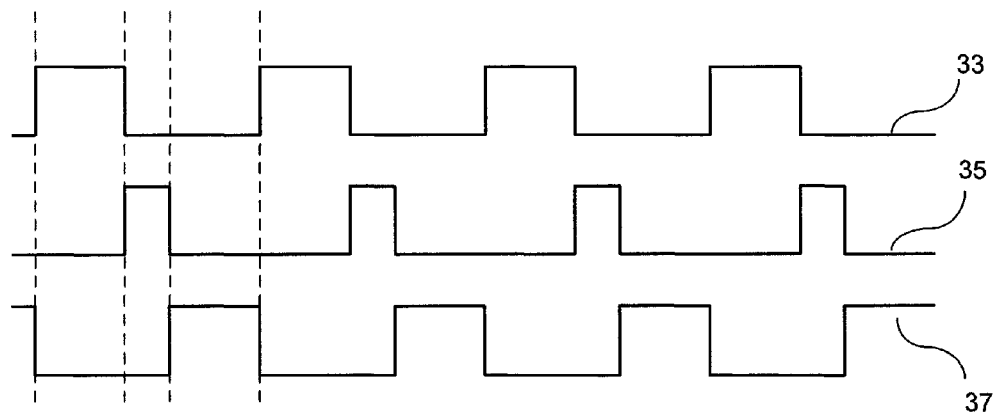

Referring now to FIG. 2B, the first control signal 33 and the second control signal 35 can have different waveforms. In this example, the first control signal 33 and the second control signal 35 have the same frequency, but have a different duty cycle. The first control signal 33 is "1" for the first 40% of the cycle, and "0" for the remaining 60% of the cycle. The second control signal 35 is "0" for the first 40% of the cycle, is "1" for the subsequent 20%, and is "0" for the remaining 40% of the cycle. The third control signal 37 has the same waveform as in the previous example.

The combined duty cycle of voltage at the coil 29 from the first input 3 and second input 7 is 60%. Thus, the voltage and current scale in the same way as in the FIG. 2A example. Significantly, the total charging current is greater than the charging current that could be provided by only one of the power sources 5, 9.

An advantage of applying the control signals in this way is that the first switch 23 and second switch 27 are never open at the same time. Therefore, the chance of current leaking to the USB power source 9 from the mains power supply 5 is minimised.

Figure 2C:
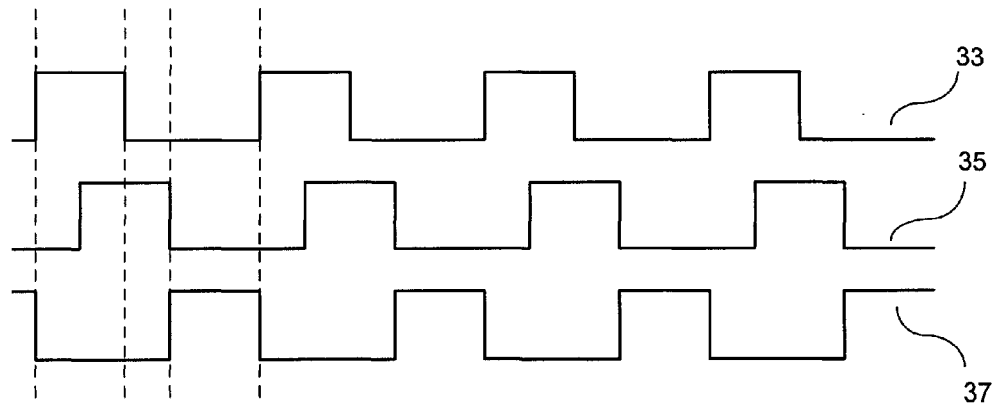

Referring now to FIG. 2C, the first control signal 33 and the second control signal 35 can have partly overlapping waveforms. In this example, the first control signal 33 is "1" for the first 40% of the cycle, and is "0" for the remaining 60% of the cycle. The second control signal 35 is "0" for the first 20% of the cycle, is "1" for the subsequent 40% of the cycle, and is "0" for the remaining 40% of the cycle. The third control signal 37 has the same waveform as in the previous examples.

The combined duty cycle of voltage at the coil 29 from the first input 3 and second input 7 is 60%. Thus, the voltage and current scale in the same way as in the FIG. 2A example. Significantly, the total charging current is greater than the charging current that could be provided by only one of the power sources 5, 9.

The charging unit 1 can allow a current to be provided to the battery 13 that exceeds the maximum current carrying capability of the AC mains power supply 5 and the USB power source 9 individually.

In addition, the voltage of the AC mains power supply 5 is not required to be the same as that required by the battery 13. Therefore, the AC mains power supply 5 can operate at a voltage that delivers the maximum power. Thus, the charging time of the battery 13 can be reduced compared to a corresponding low voltage mains power supply arrangement.

In another example (not shown), the SMPS 15 can operate in a discontinuous mode. In the discontinuous mode, the first and second oscillating signals are "0" for a duration long enough to allow the current through the coil 29 to become zero between pulses. This has the advantage of reducing the probability of switch timing problems. This also helps to match different power inputs together by reserving own time sot for every current*duty cycles.

In yet another example (not shown) the pulses of the first and second control signals are shorter, and there are parts of the cycle between the "1" part of the first control signal and the "1" part of the second control signal that are at "0". This can be caused by the conduction cycle of the MOSFETs comprising the first and second switches 23, 27 that are driven in and out of phase.

As described above, the total duty cycle at the coil 29 can be provided by different arrangements in the first and second control signals 33, 35. The duty cycle can be split into different parts and treated like an average duty cycle i.e. there may be more than one "1" part of each of the first and second control signals 33, 35 in a single cycle.

In the charging unit 1, the first switch 23 and the second switch 27 can be independently controlled. Therefore, the voltage and current for each of the AC mains power supply 5 and the USB power source 9 can be independently adjusted.

Figure 3:
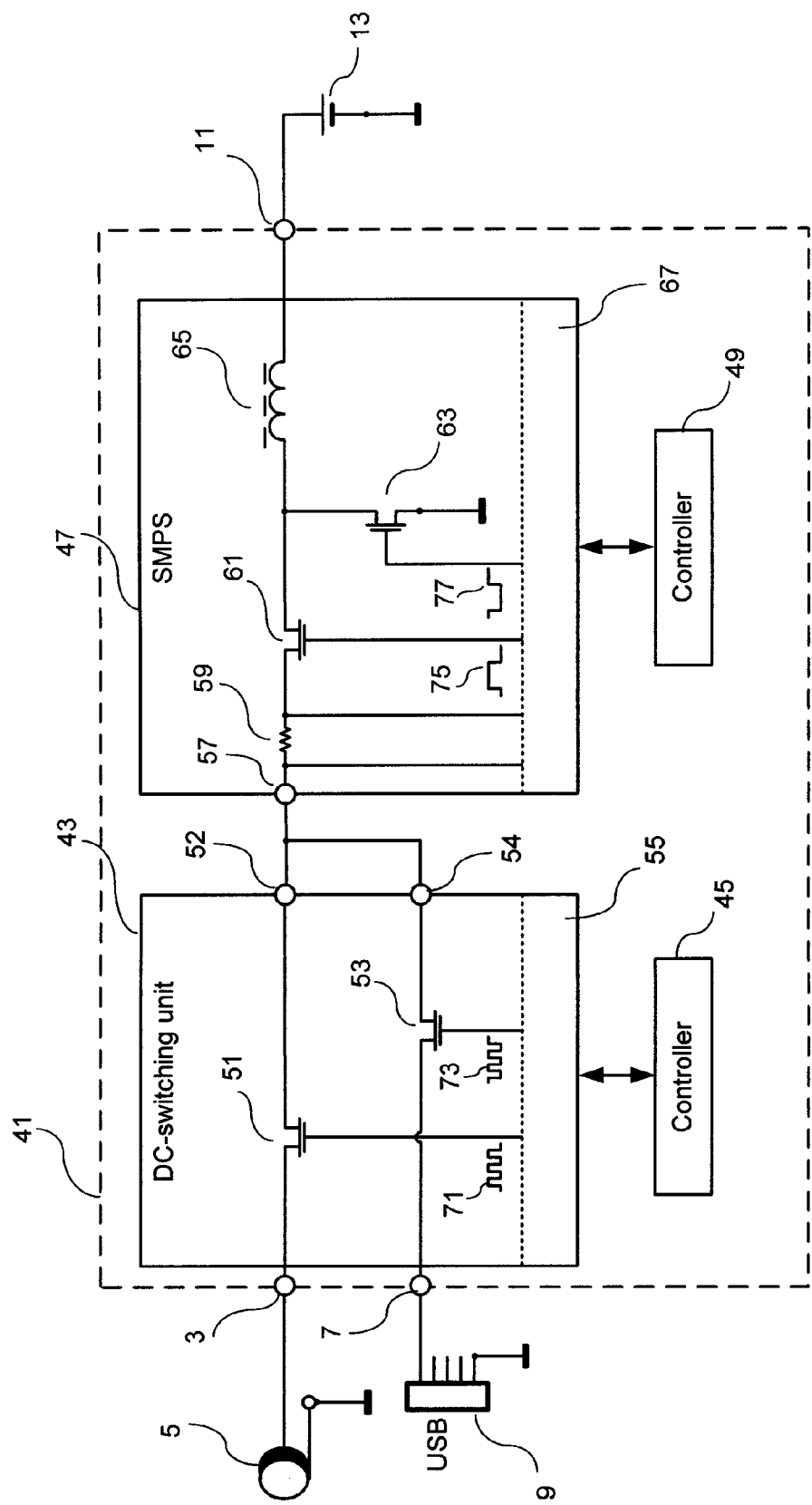
FIG. 3 is a schematic of a second embodied charging unit according to the present invention.

Referring now to FIG. 3, in which reference numerals are retained for like elements, a second embodied charging unit 41 comprises a first input 3 connected to an AC mains power supply 5 and a second input 7 connected to a USB power supply 9. The charging unit 41 also comprises an output 11 connected to a rechargeable battery 13. The AC mains power supply 5 and the USB power supply 9 are the same as those connected to the FIG. 1 charging unit 1.

The charging unit 41 comprises a DC switching unit 43, a first controller 45, an SMPS 47, and a second controller 49.

The DC switching unit 43 comprises a first switch 51 connecting the first input 3 to a first output 52 of the DC switching unit 43. The DC switching unit 43 also comprises a second switch 53 connecting the second input 7 to a second output 54 of the DC switching unit. The DC switching unit 43 also comprises a control part 55 operable to receive control signals from the first controller 45. The first switch 51 and the second switch 53 are MOSFETs, each having a gate connected to the control part 55 for receiving control signals.

The first output 52 and the second output 54 are commonly connected to an input 57 of the SMPS 47. The SMPS 47 is a conventional buck converter. The SMPS 47 comprises a current measurement resistor 59, a third switch 61, and a fourth switch 63. The third switch 61 is connected via the current measurement resistor 59 to the input 57. The third switch 61 connects the input 57 to an input of a coil 65. The input of the coil 65 is also connected via the fourth switch 63 to ground. An output of the coil 65 is connected to the output 11 of the charging unit 41.

The third switch 61 and the fourth switch 63 are MOSFETs, each having a gate connected to a control part 67 of the SMPS 47. The control part 67 is operable to receive control signals 49 from the controller for controlling the third and fourth switches 61, 63 and measuring the voltage and current across the current measurement resistor 59.

A sum of the output of the first switch 51 and the output of the second switch 53 is controlled to be a DC signal. Therefore, a DC signal is provided to the input 57 of the SMPS 47. To achieve this, a first control signal 71 applied to the gate of the first switch 51 is arranged so as to be complimentary to a second control signal 73 applied to the gate of the second switch 53. Also, this results in first switch 51 and the second switch 53 not being closed at the same time. This minimises the chance of current flowing to the USB power source 9 from the mains power supply 5.

The second controller 49 is operable to provide a third oscillating control signal 75 to the third switch 61. The duty signal of the third control signal is directly proportional to the voltage scaling of the SMPS 47. In this example, the duty cycle of the third control signal is arranged to be 60%, so as to provide a voltage of 3V to the battery 13.

The second controller 49 is operable to provide a fourth control signal 77 to the control part 67, for controlling the fourth switch 63. The fourth control signal is complimentary to the third control signal. Therefore the third switch 61 and the fourth switch 63 are never on at the same time.

Figure 4:
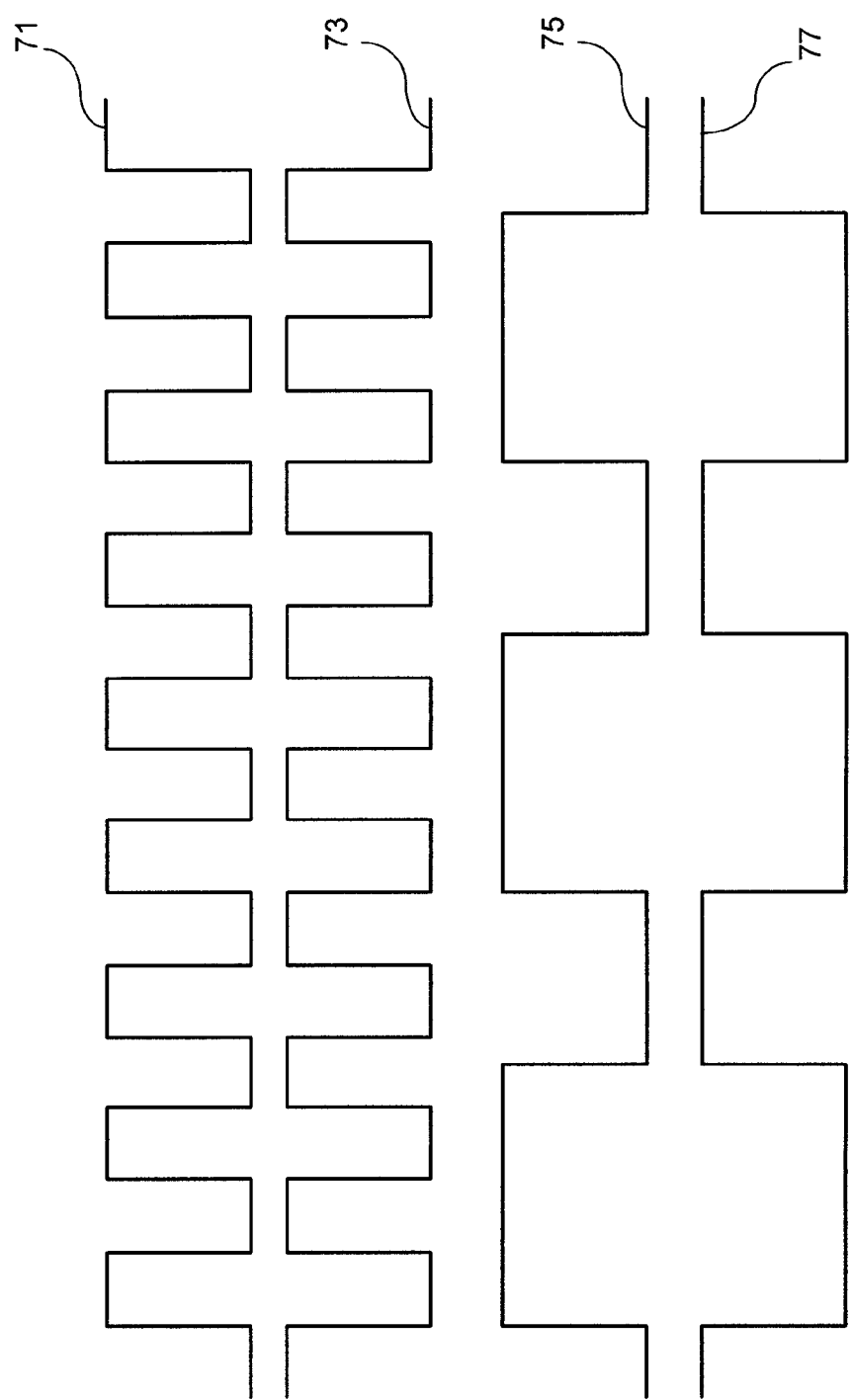
FIG. 4 illustrates control signals applied to the FIG. 3 charging unit.

Referring now to FIG. 4, in one example the first control signal 71 and the second control signal 73 which are applied to the first and second switches 51, 53 respectively, have identical waveforms that are 180° out of phase. The first control signal is "1" for the first 50% of the cycle, and is "0" for the remaining 50% of the cycle. The second control signal 73 is "0" for the first 50% of the cycle, and is "1" for the remaining 50% of the cycle. Thus, the sum of the first output 52 and the second output 54 of the DC switching unit 43 is a DC voltage.

The third control signal 75, which is applied to the first switch 61, has a period three times that of the period of the first and second control signals 71, 73. The duty cycle of the third control signal is 60%. Thus, the third control signal is "1" for the first 60% of the cycle, and "0" for the remaining 40% of the cycle. The fourth control signal 77, which is applied to the fourth switch 63, is "0" for the first 60% of the cycle, and "1" for the remaining 40% of the cycle.

Using calculations similar to those used for the FIG. 1 charging unit 1, it can be shown that a direct current of 2.25 amps at a voltage of 3 volts is provided to the battery 13. Significantly the total charging current is greater than the charging current that could be provided by only one of the power sources 5, 9.

In another example (not shown), the first control signal 71 and the second control signal 73 do not have the same waveform. For example, the first control signal 71 may be on for the first 66% of the cycle, and the second control signal may be on for the remaining 33% of the cycle. This allows the current drawable from the mains power supply 5 to be double the current drawable from the USB power supply 9. In addition, the third control signal 75 may have a period that is not an integer multiple of the period of the first and second control signals 71, 73. Also, the first and second control signals 71, 73 may have a period that is longer that the period of the third control signal 75.

In this example, the first controller 45 and the second controller 49 do not communicate with one another. However, in other examples the first controller 45 and the second controller 49 may be connected, for synchronising the control signals.

In the above-described examples, an AC mains power source 5 and a USB power source 9 are connected to the first input 3 and the second input 7 respectively. It will be appreciated that instead different types of power source can be connected to the first input 3 and the second input 7.

Figure 5:
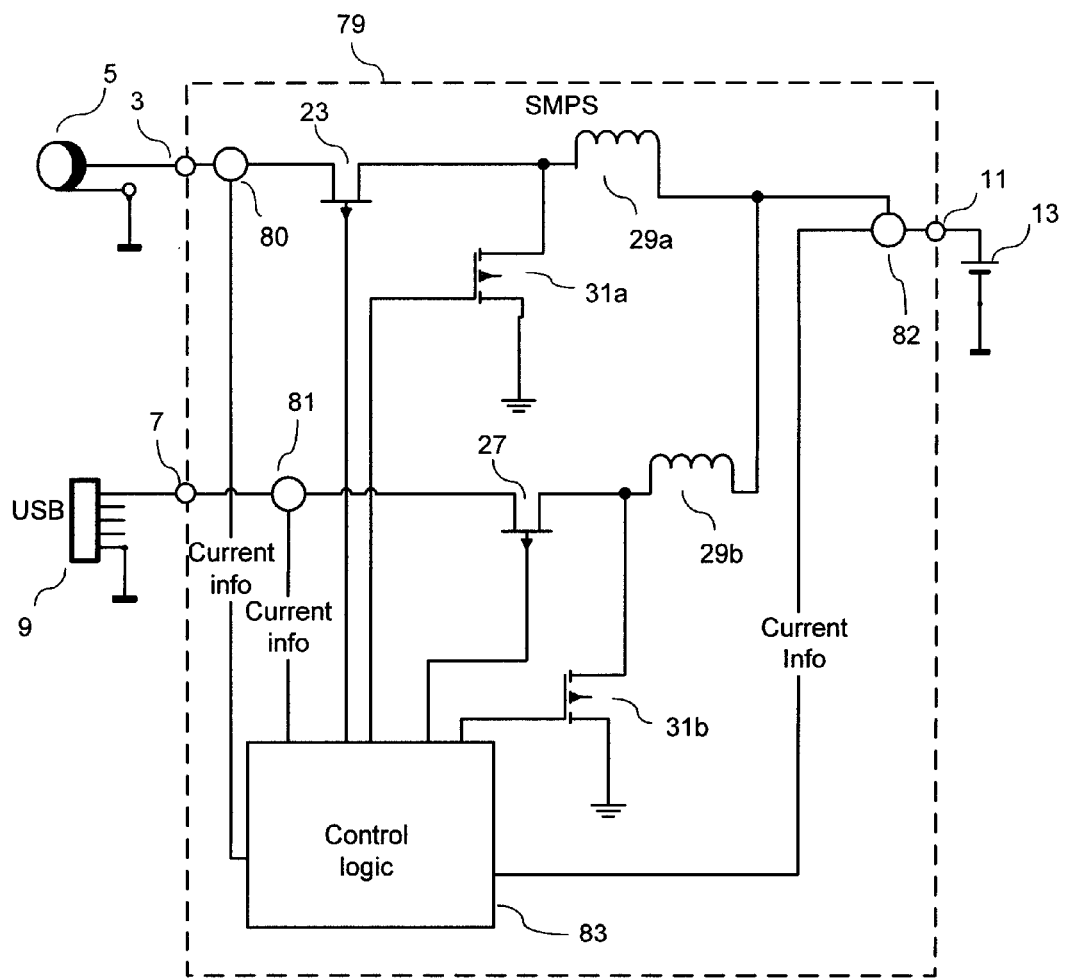
FIG. 5 is a schematic of a third embodied charging unit according to the present invention.

Referring now to FIG. 5, in which reference numerals are retained for like elements, a third embodied charging unit 79 is provided with a first current measurement node 80 between a first input 3 and a first switch 23. The charging unit 79 is also provided with a second current measurement node 81 between a second input 7 and a second switch 27. The charging unit also comprises a third current measurement node 82 at an output 11.

The charging unit 79 comprises a first coil 29a connected between the first switch 23 and the output 11, and a second coil 29b connected between the second switch 27 and the output 81. The input of the first coil 29a is connected via a third switch 31a to ground. The input of the second coil 29b is connected via a fourth switch 31b to ground.

The charging unit 79 comprises a single control logic block 83, which is operable to control measurement the current at the current measurement nodes 80, 81, 82, and calculate and generate control signals to be provided to the switches 23, 27, 31a, 31b.

The arrangement allows the maximum allowed power to be provided from the first and second input 3, 7 independently.

Figure 6:
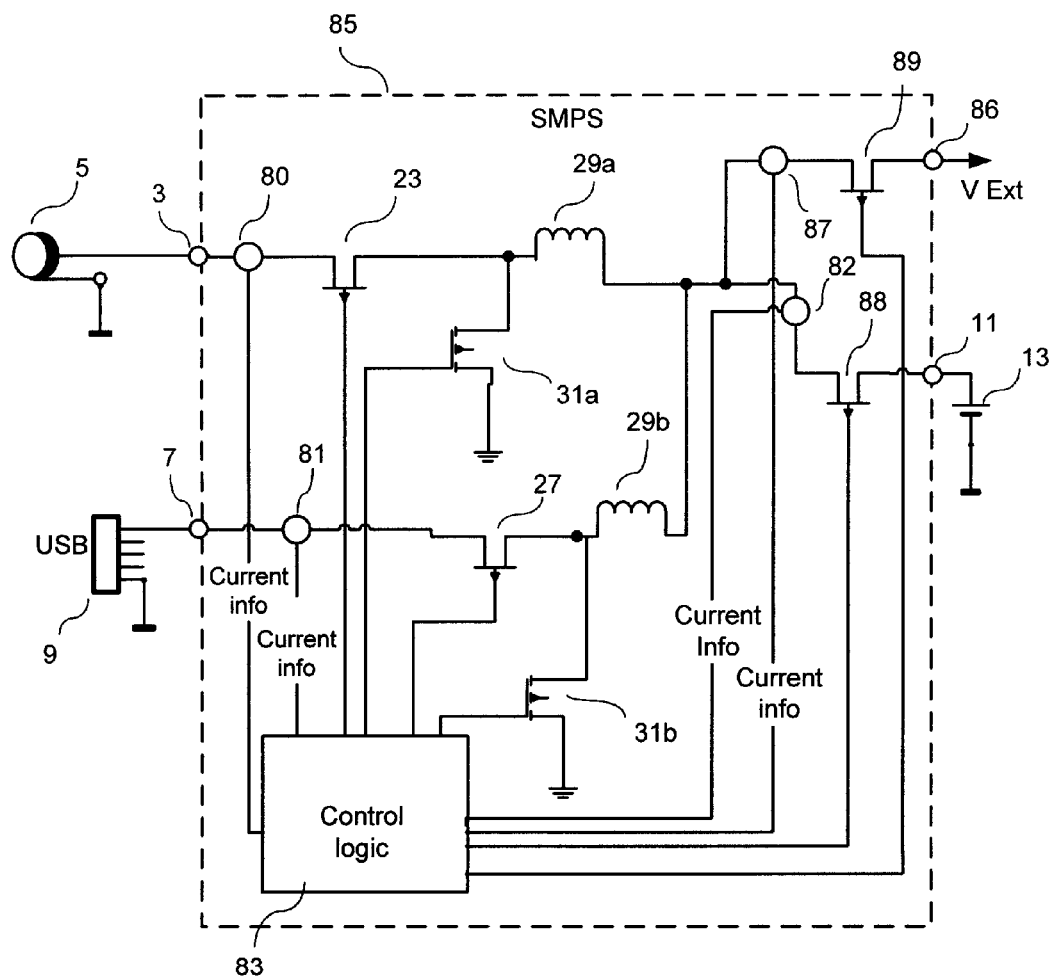
FIG. 6 is a schematic of a fourth embodied charging unit according to the present invention.

Referring now to FIG. 6, in which like reference numerals are retained from FIG. 5 for like elements, a fourth embodied charging unit 85 has a first output 11 for connection to a battery 13, and a second output 86 e.g. for powering a portable device containing the charging unit 85.

The charging unit 85 has substantially the same internal structure as the FIG. 5 charging unit 79. However, the charging unit 85 further comprises a fourth current measurement node 87 at the second output 86. The charging unit 85 also comprises a first FET 88 connected between the first and second coils 29a, 29b and the first output 11, and a second FET 89 connected between the first and second coils 29a, 29b and the second output 86. The control logic 83 is connected to the first and second FET 88, 89 for providing control signals.

The first and second switches 23, 27 of the FIGS. 5 and 6 charging units 79, 85 can be controlled by first and second control signals that are substantially the same as the first and second control signals 33, 35 described above with respect to FIGS. 1 and 2.

Figure 7:
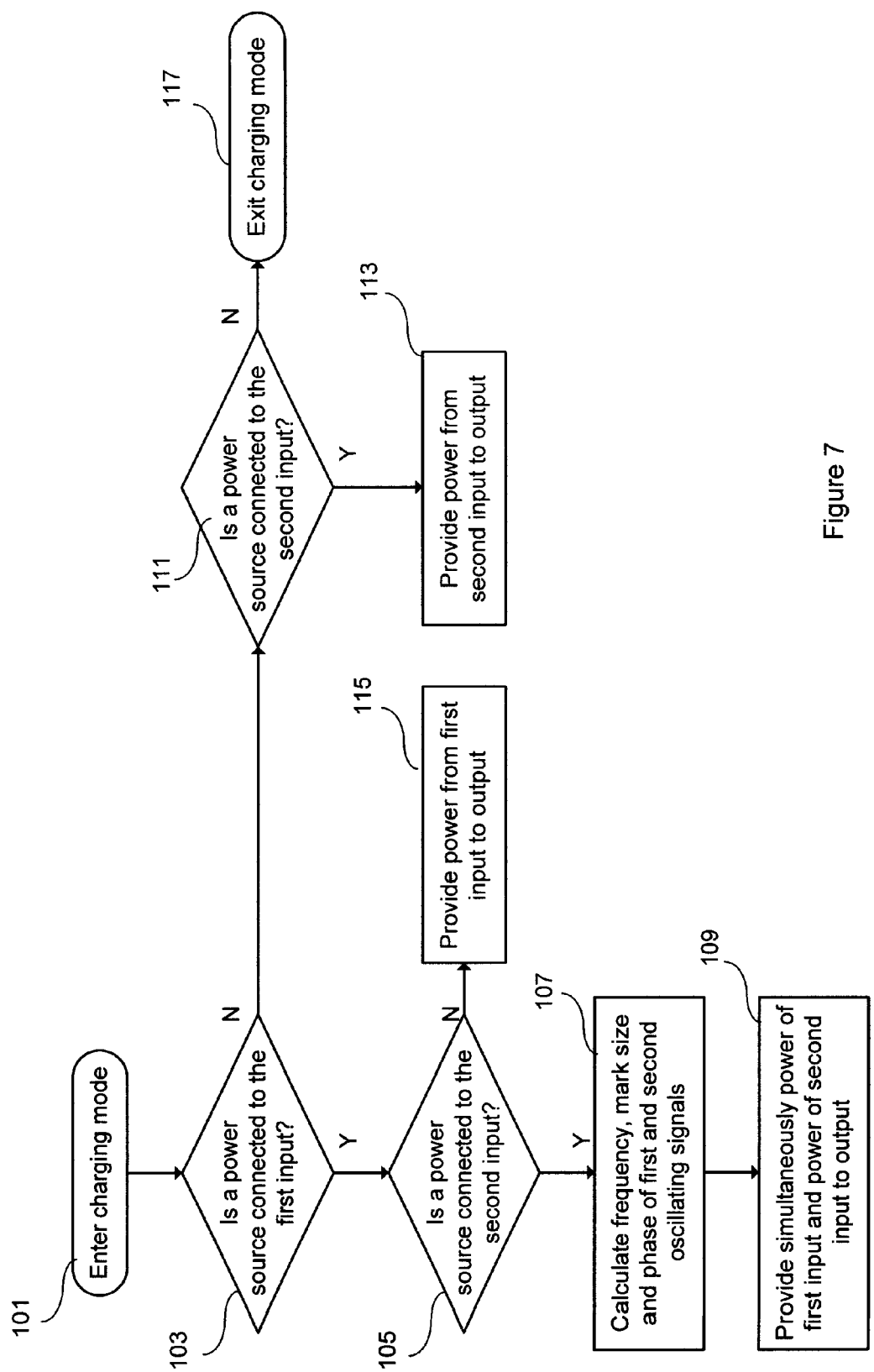
FIG. 7 is a flow diagram illustrating a method of operating a charging unit according to the present invention.

Referring now to FIG. 7, a method of operating a charging unit is described with reference to the FIG. 1 charging unit 1. However, it will be appreciated that the method applies also to the FIG. 3 charging unit 41, the FIG. 5 charging unit 79 and the FIG. 6 charging unit 85.

The method starts at step 101 when the charging unit 1 enters a charging mode. The charging unit 1 may enter charging mode upon detection of a change at one of the first input 3 or the second input 7. Alternatively, the charging unit 1 may enter charging mode after a predetermined period.

At step 103, it is determined whether a power source is connected to the first input 3. If it is determined that a power source is connected, the operation proceeds to step 105. At step 105, it is determined whether a power source is connected to the second input 7. If it is determined that a power source is connected, the operation proceeds to step 107.

At step 107, the controller 17 calculates the frequency, mark size, and phase of the first and second oscillating control signals 33, 35 (FIG. 2) that are applied to the first and second switches 23, 27 respectively.

At step 109, the first and second oscillating control signals 33, 35 are provided to the first and second switches 23, 27 respectively. This causes the SMPS 15 simultaneously to provide the power from the first input 3 and the power from the second input 7 to the output 11 of the charging unit 1.

It will be appreciated that power can be provided simultaneously even in the case where the first control signal 33 and the second control signal 35 to not overlap. This is because the coil 29 is operable to store energy provided from the power sources during the "1" part of the first and second oscillating signals, and is operable to provide this stored energy to the output during the "0" part of both the first and second oscillating control signals.

If at step 103 it is determined that no power source is connected to the first input 3, the operation proceeds to step 111. At step 111, it is determined whether a power source is connected to the second input 7. If a power source is connected, the operation proceeds to step 113. At step 113, power is provided from the second input 7 only to the output 11.

If at step 105 it is determined that no power source is co connected to the second input 7, the operation proceeds to step 115. At step 115, power is provided from the first input 3 only to the output 11.

If at step 111 it is determined that no power source is connected to the second input 3, the operation proceeds to step 117. At step 117, the charging unit 1 exits charging mode, since there is no power that can be provided to the charging unit 1.

It should be realised that the foregoing examples should not be construed as limiting. Other variations and modifications will be apparent to persons skilled in the art upon reading the present application. Such variations and modifications extend to features already known in the field, which are suitable for replacing the features described herein, and all functionally equivalent features thereof. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

For example, the third switch 31 of the FIG. 1 charging unit 1 may be replaced with a diode. Similarly, the fourth switch 63 of the FIG. 3 charging unit 41 may be replaced with a diode. In addition, the SMPS 15 of the FIG. 1 charging unit 1 or the SMPS 47 of the FIG. 3 charging unit 41 can be based on a different type of SMPS. For example, they may be based on a boost converter. Alternatively, the coil 29 of the FIG. 1 charging unit 1 or the coil 65 of the FIG. 3 charging unit 41 may be replaced with a transformer.

The invention claimed is:

1. A charging unit comprising:
   a first input connectable to a first power source;
   a second input connectable to a second power source;
   an output, for connection to a battery to be charged; and
   a power supply unit operable simultaneously to provide power from the first input and power from the second input to the output;
   wherein the power supply unit comprises:
   a first switching unit;
   a second switching unit; and
   a converter having an input and an output,
   the first switching unit being connected between the first input and the input of the converter, and the second switching unit being connected between the second input and the input of the converter, and the output of the converter being connected to the output of the charging unit wherein the power supply unit further comprises a controller operable simultaneously to provide first and second oscillating control signals to the first and second switching units respectively.

2. A charging unit comprising:
   a first input connectable to a first power source;
   a second input connectable to a second power source;
   an output, for connection to a battery to be charged; and
   a power supply unit comprising:
   a first switching unit;
   a second switching unit;
   a converter having an input and an output; and
   a controller;
   the first switching unit being connected between the first input and the input of the converter, and the second switching unit being connected between the second input and the input of the converter, the output of the converter being connected to the charging unit output, wherein the controller is operable simultaneously to provide first and second oscillating control signals to the first and second switching units respectively.

3. The charging unit as claimed in claim 2, wherein the first and second oscillating control signals have the same frequency.

4. The charging unit as claimed in claim 2, wherein the first and second oscillating control signals have different frequencies.

5. The charging unit as claimed in claim 2, wherein the first and second oscillating control signals are such as to control the first and second switching units to provide oscillating voltages having non-overlapping marks.

6. The charging unit as claimed in claim 2, wherein the first and second oscillating control signals are such as to control the first and second switching units to provide oscillating voltages having fully overlapping marks.

7. The charging unit as claimed in claim 2, wherein the first and second oscillating control signals are such as to control the first and second switching units to provide oscillating voltages having partly overlapping marks.

8. The charging unit as claimed in claim 2, further comprising a third switching unit connected between the converter and the first and second switching units.

9. charging unit as claimed in claim 2, further comprising a third switching unit connected between the converter and the first and second switching units, wherein the first and second oscillating control signals are in antiphase.

10. A charging unit comprising:
    a first input connectable to a first power source;
    a second input connectable to a second power source;
    an output, for connection to a battery to be charged;
    and a power supply unit comprising:
    a first switching unit;
    a second switching unit;
    a first converter having an input and an output;
    a second converter having an input and an output; and
    a controller;
    the first switching unit being connected between the first input and the input of the first converter, and the second switching unit being connected between the second input and the input of the second converter, the output of the first converter and the output of the second converter being commonly connected to the charging unit output, wherein the controller is operable simultaneously to provide first and second oscillating control signals to the first and second switching units respectively.

11. The charging unit as claimed in claim 10, wherein the charging unit further comprises a second output, the output of the first converter and the output of the second converter being commonly connected to the second charging unit output.

12. The charging unit as claimed in claim 10, wherein the first input is coupled to USB connector.

13. The charging unit as claimed in claim 10, wherein the second input is coupled to a mains electricity power supply connector.

14. The charging unit as claimed in claim 10 provided as a portable device.

15. A method of operating a charging unit, the charging unit comprising:
    a first input connectable to a first power source;
    a second input connectable to a second power source;
    an output, for connection to a battery to be charged; and
    a power supply unit,
    wherein the power supply unit comprises:
    a first switching unit;
    a second switching unit; and
    a converter having an input and an output,
    the first switching unit being connected between the first input and the input of the converter, and the second switching unit being connected between the second input and the input of the converter, and the output of the converter being connected to the output of the charging unit;
    the method comprising:
    controlling the power supply unit simultaneously to provide at the output power from the first input and power from the second input.

16. A non-transitory computer readable medium storing computer readable instructions for calculating a frequency, a mark size and a phase of each of first and second oscillating control signals for feeding to first and second switching units respectively of a charging unit as claimed in claim 1.

* * * * *

UNITED STATES PATENT AND TRADEMARK OFFICE
CERTIFICATE OF CORRECTION

| | |
|---|---|
| PATENT NO. | : 8,564,249 B2 |
| APPLICATION NO. | : 12/520567 |
| DATED | : October 22, 2013 |
| INVENTOR(S) | : Timo Tapani Lundqvist and Jari Tuomo Pistemaa |

Page 1 of 1

It is certified that error appears in the above-identified patent and that said Letters Patent is hereby corrected as shown below:

IN THE CLAIMS:

In Claim 9, Column 10, line 4, insert --The-- before the word "charging".

Signed and Sealed this
Twenty-fourth Day of December, 2013

Margaret A. Focarino
*Commissioner for Patents of the United States Patent and Trademark Office*